(12) United States Patent
Na et al.

(10) Patent No.: US 9,847,145 B2
(45) Date of Patent: Dec. 19, 2017

(54) METHOD FOR FABRICATION OF OXIDE FUEL PELLETS AND THE OXIDE FUEL PELLETS THEREBY

(71) Applicant: Korea Atomic Energy Research Institute, Daejeon (KR)

(72) Inventors: Sang Ho Na, Daejeon (KR); See-Hwan Park, Daejeon (KR); Ho-Dong Kim, Daejeon (KR); Dae-Yong Song, Daejeon (KR); Hee-Sung Shin, Daejeon (KR); Bo-Young Han, Seoul (KR); Hee Seo, Gyeonggi-do (KR); Byung-Hee Won, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 692 days.

(21) Appl. No.: 14/583,350

(22) Filed: Dec. 26, 2014

(65) Prior Publication Data

US 2016/0372216 A1    Dec. 22, 2016

(30) Foreign Application Priority Data

Dec. 27, 2013    (KR) .................. 10-2013-0164738

(51) Int. Cl.
*G21C 3/62*    (2006.01)
*G21C 21/04*    (2006.01)
(Continued)

(52) U.S. Cl.
CPC ............... *G21C 3/623* (2013.01); *G21C 3/02* (2013.01); *G21C 21/04* (2013.01);
(Continued)

(58) Field of Classification Search
None
See application file for complete search history.

(56) References Cited

U.S. PATENT DOCUMENTS 3,063,793 A * 11/1962 Rawson ............... C01G 43/025
                                                          252/625
3,129,055 A *  4/1964 Bel ...................... C01G 43/025
                                                          264/0.5
(Continued)

FOREIGN PATENT DOCUMENTS

JP           2790548 B2    12/1998
KR        100293482 B1     7/2001
(Continued)

*Primary Examiner* — Joseph D Anthony
(74) *Attorney, Agent, or Firm* — Fredrikson & Byron, P.A.

(57) ABSTRACT

Disclosed herein is a method for manufacturing oxide fuel pellets. The method for manufacturing the oxide fuel pellets includes (step 1) preparing nuclear fuel powder containing uranium dioxide ($UO_{2+x}$, x=0 to 0.20), (step 2) compacting the nuclear fuel powder prepared in step 1 to manufacture green pellets, sintering the green pellets manufactured in step 2 at a temperature of about 1,200° C. to about 1,400° C. by using an atmosphere gas, and reducing the green pellets sintered in step 3 at a temperature of about 800° C. to about 1,000° C. by using a reducing atmosphere gas. The method for manufacturing the oxide fuel pellets according to the present invention performs the sintering at a low temperature of about 1,200° C. to 1,400° C. to manufacture economical and safe oxide fuel pellets that are adequate for the nuclear fuel specification.

10 Claims, 10 Drawing Sheets

(51) Int. Cl.
  *G21C 3/02* (2006.01)
  *G21C 3/04* (2006.01)
(52) U.S. Cl.
  CPC .... *G21C 2003/045* (2013.01); *G21Y 2004/40* (2013.01); *Y02E 30/38* (2013.01)

(56) References Cited

U.S. PATENT DOCUMENTS

| | | | | |
|---|---|---|---|---|
| 3,194,852 | A | * | 7/1965 | Lloyd .................... C01G 43/01 252/639 |
| 3,272,602 | A | * | 9/1966 | Suehiro ................ C01G 43/025 423/261 |
| 3,923,933 | A | * | 12/1975 | Lay ........................ G21C 3/623 252/636 |
| 4,671,904 | A | * | 6/1987 | Dorr ...................... G21C 3/623 252/637 |
| 5,211,905 | A | * | 5/1993 | Wood .................. C01G 43/025 264/5 |
| 2013/0175719 | A1 | * | 7/2013 | Na .......................... G21C 19/42 264/0.5 |

FOREIGN PATENT DOCUMENTS

| | | |
|---|---|---|
| KR | 100855108 B1 | 8/2008 |
| KR | 101265258 B1 | 5/2013 |

* cited by examiner

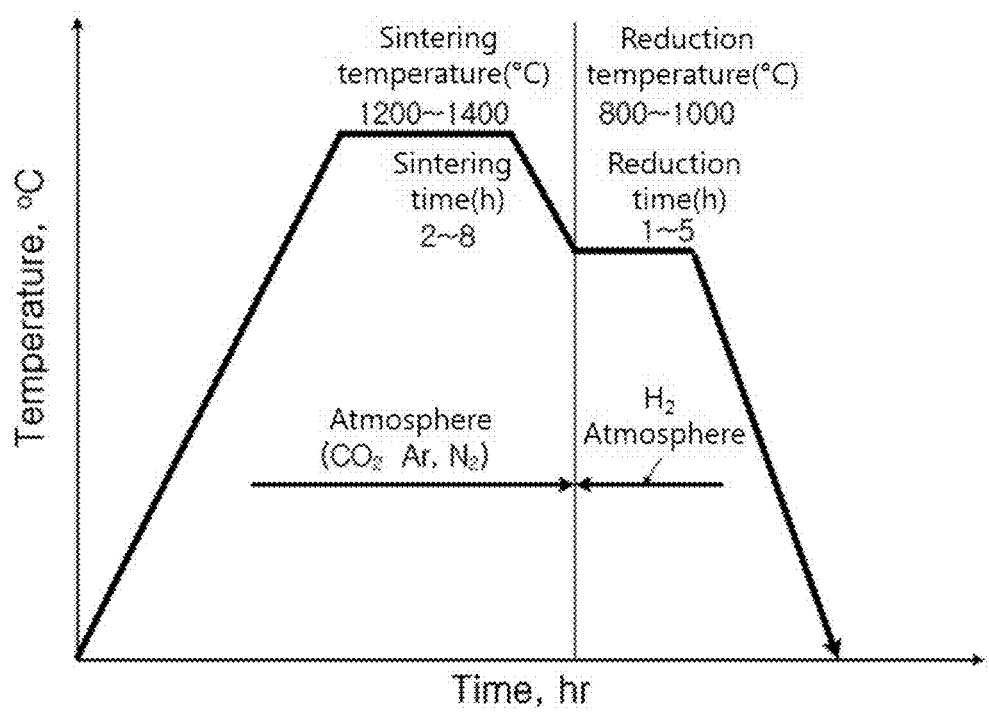
[Fig 1]

[Fig 2]
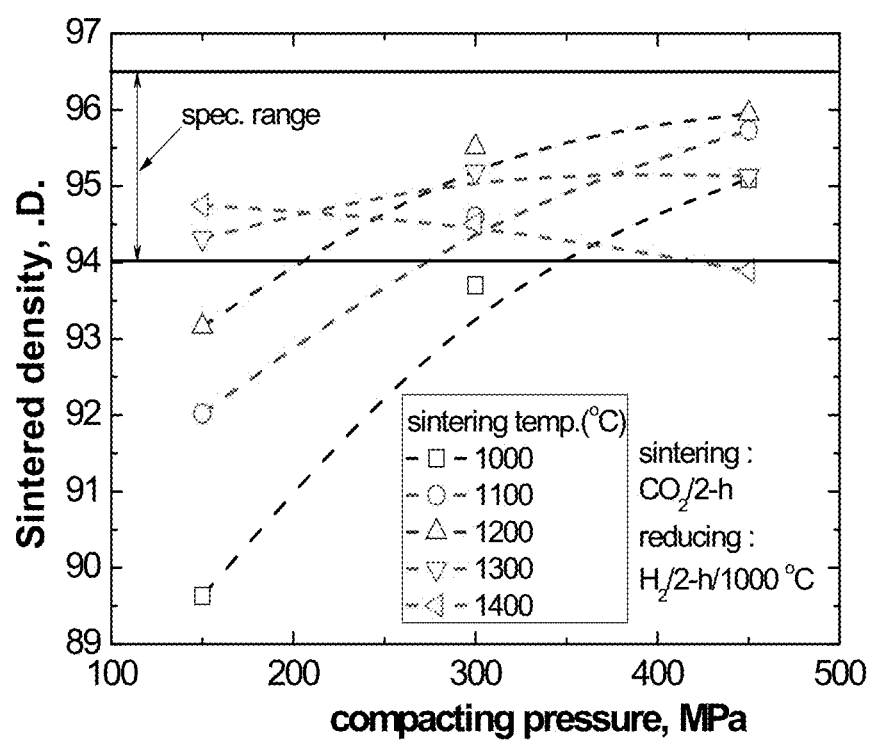

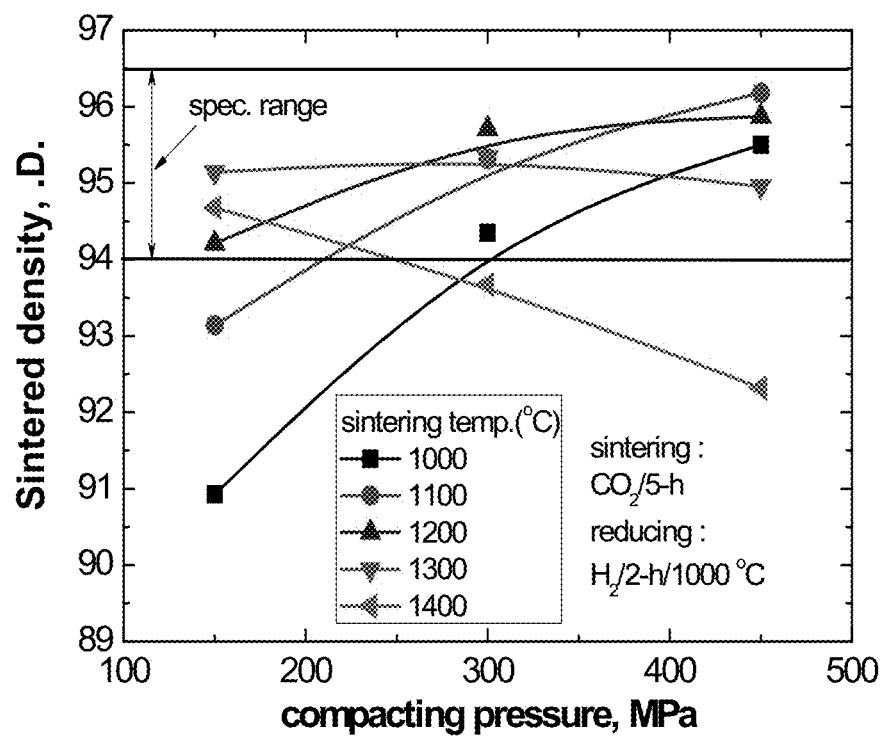
[Fig 3]

[Fig 4]
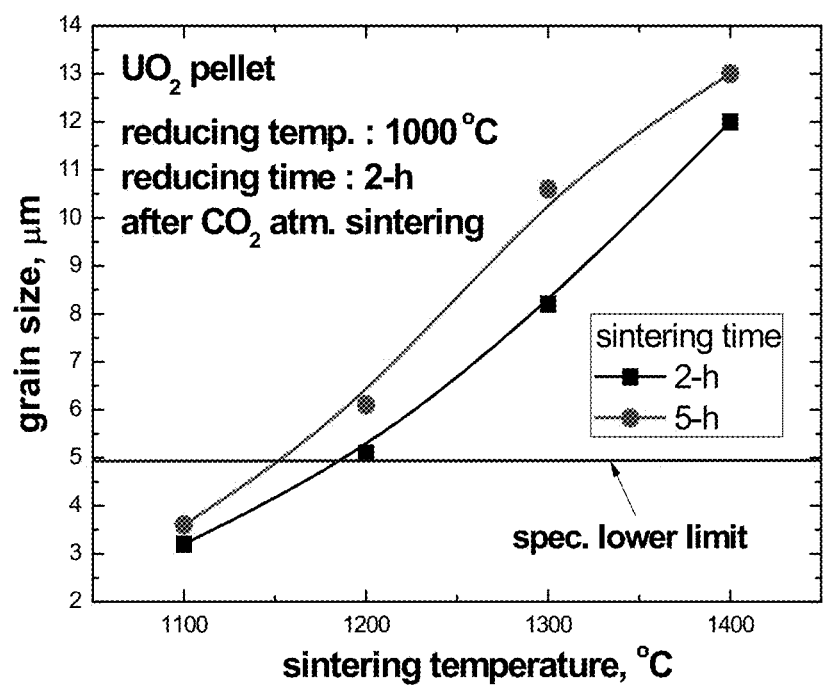

[Fig 5]
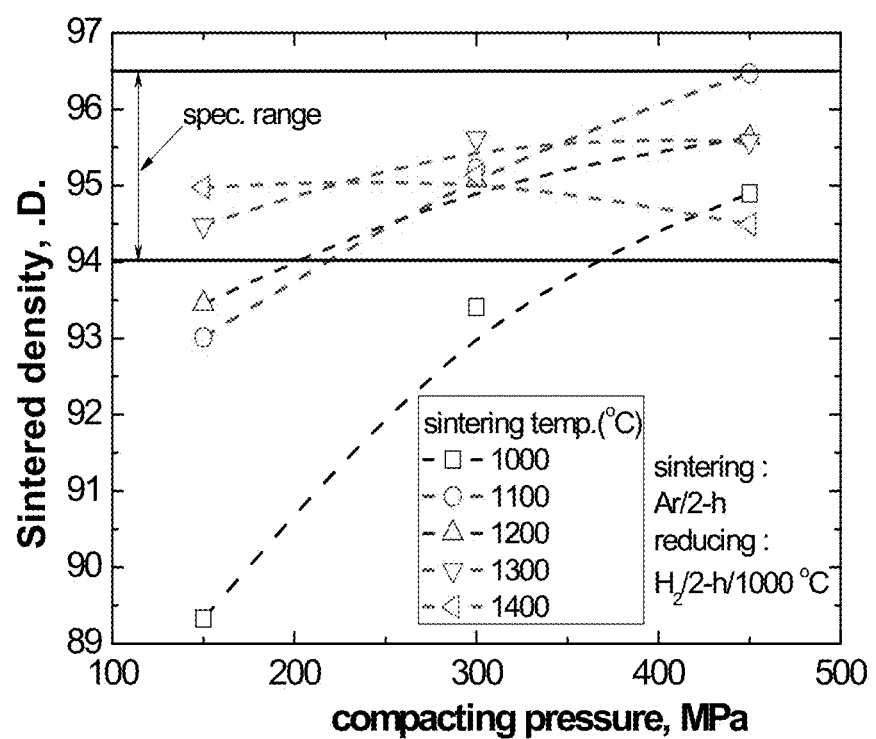

[Fig 6]
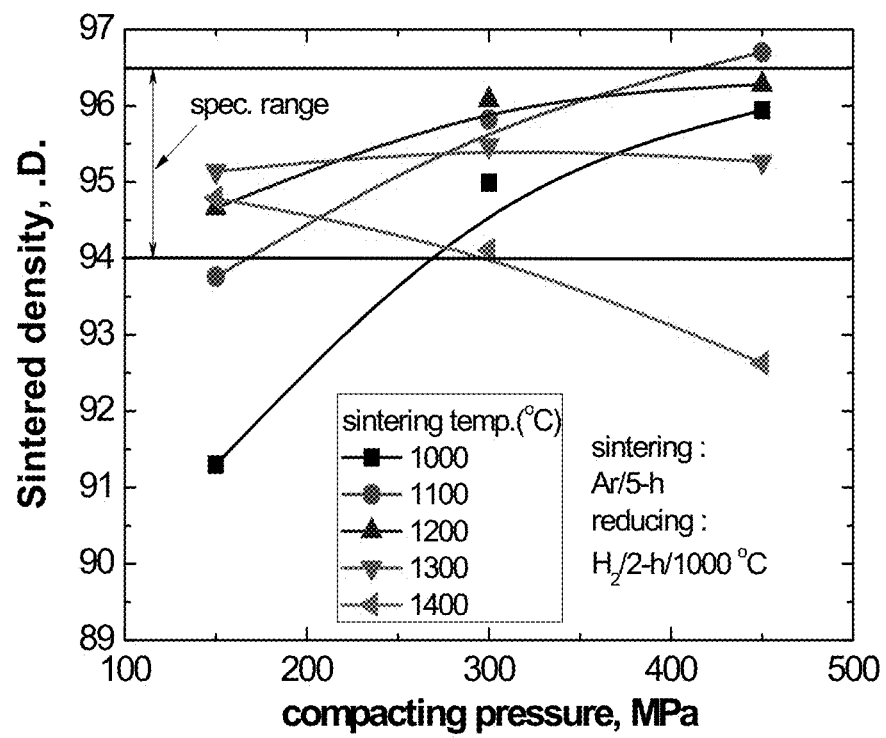

[Fig 7]
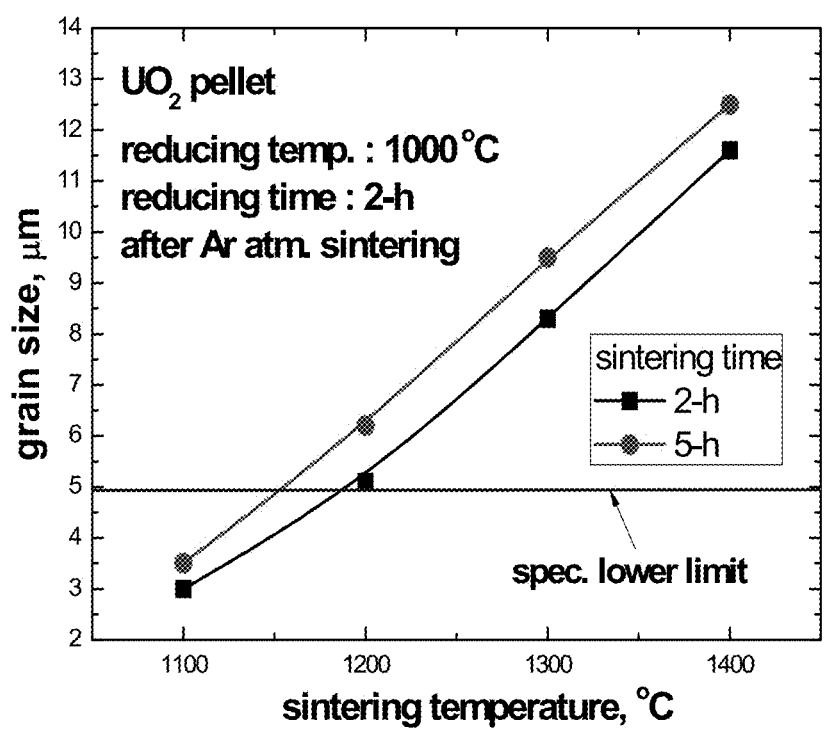

[Fig 8]
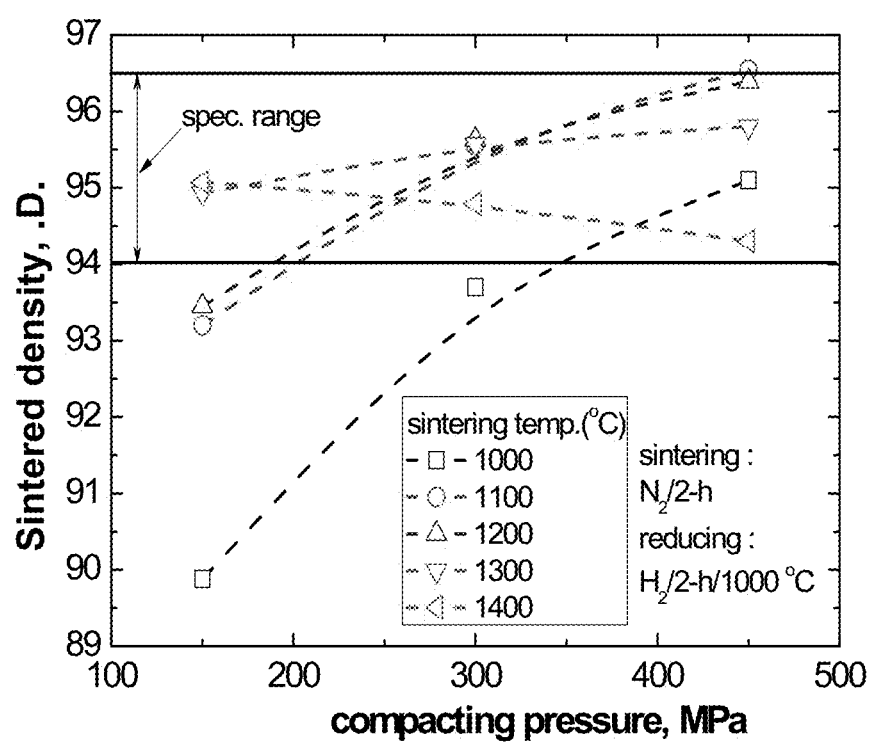

[Fig 9]
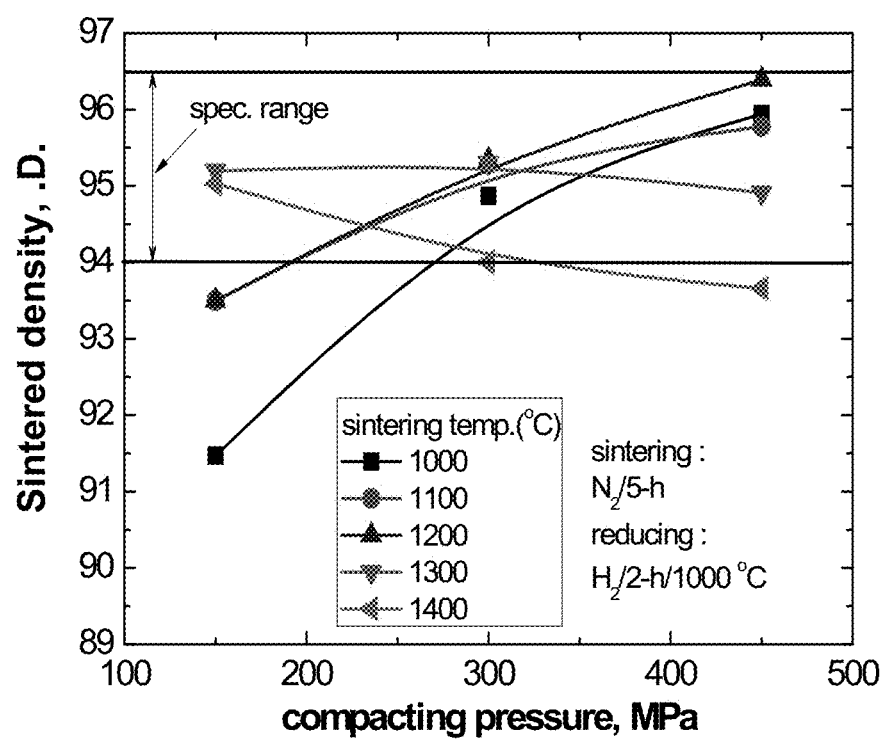

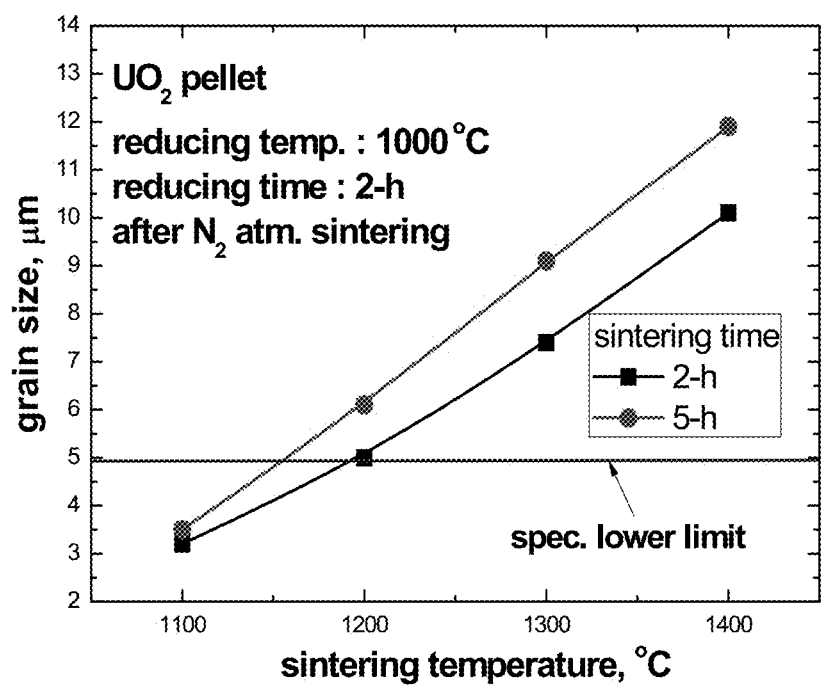
[Fig 10]

METHOD FOR FABRICATION OF OXIDE FUEL PELLETS AND THE OXIDE FUEL PELLETS THEREBY

CROSS-REFERENCES TO RELATED APPLICATION

This patent application claims the benefit of priority under 35 U.S.C. §119 from Korean Patent Application No. 10-2013-0164738 filed Dec. 19, 2013, the contents of which are incorporated herein by reference.

BACKGROUND OF THE INVENTION

1. Field of the Invention

The present disclosure relates to a method for manufacturing oxide fuel pellets and oxide fuel pellets manufactured thereby.

2. Description of the Related Art

Nuclear power generation uses heat generated by the nuclear fission. Oxide fuel pellets are put into a zirconium alloy cladding tube to seal each of both ends of the zirconium alloy cladding tube by welding, thereby manufacturing a fuel rod. Then, several fuel rods to several hundred fuel rods are bundled with each other to manufacture one assembly or bundle. The assembly or bundle may be fed into a light-water type power reactor or heavy-water type power reactor. Here, heat generated from the oxide fuel pellets is transferred into cooling water that flows around the fuel rods through the cladding tube via the oxide fuel pellets.

A nuclear fuel may be prepared as cylindrical or globular oxide fuel pellets that are manufactured by compacting and sintering a single or mixed material of oxides such as uranium (U), plutonium (Pu), or thorium (Th). The oxide fuel pellets are generally formed of uranium dioxide ($UO_2$). Alternatively, the oxide fuel pellets may be formed of a material that is prepared by adding at least one of other nuclear fuel materials such as oxides of Pu, Th, Gd, and Er to uranium dioxide (UO2). Particularly, the oxide fuel pellets may be formed of $(U,Pu)O_2$, $(U,Th)O_2$, $(U,Gd)O_2$, $(U,Er)O_2$, $(U,Pu,Gd)O_2$, or $(U,Th,Pu)O_2$.

Uranium dioxide ($UO_2$) pellets may be widely known as the nuclear fuel pellets. A method for manufacturing the uranium dioxide ($UO_2$) pellets includes a process of adding and mixing a lubricant into/with uranium oxide powder that is used as a starting material to perform a preliminary compaction process at a pressure of about 1 ton/cm², thereby manufacturing slug, a process of pulverizing the slug to produce granules, a process of adding and mixing a lubricant into/with the produced granules to perform a compression-compaction process, thereby manufacturing green pellets having a theoretical density (T.D) of about 50%, and a process of sintering the green pellets at a temperature of about 1,600° C. to about 1,800° C. for about 2 hours to about 4 hours under a hydrogen-containing gas atmosphere. The manufactured uranium dioxide pellets may have a density of about 95% of a theoretical density and a grain size of about 5 μm to about 25 μm.

However, when the green pellets are sintered at a high temperature of about 1,600° C. or more under the hydrogen atmosphere as described above, the risk of explosion of hydrogen may be involved. Also, electricity may be excessively consumed due to the sintering at the high temperature, and thus, the above-described manufacturing process may be uneconomical.

Also, in the low-temperature sintering method according to the related art, a method in which a sintering process is performed at a low temperature (about 1,400° C. or less) under an atmosphere in which a ratio of carbon dioxide/carbon monoxide is adjusted. However, in the low-temperature sintering method, it may be difficult to adjust the ratio of carbon dioxide/carbon monoxide, and thus it may be difficult to manufacture oxide fuel pellets that are adequate for nuclear fuel specification.

Thus, while the inventors study methods for manufacturing oxide fuel pellets, the inventors have developed a method in which green pellets are manufactured by using nuclear fuel powder containing uranium dioxide ($UO_2$), and the manufactured green pellets are sintered and reduced by using an atmosphere gas at a low-temperature of about 1,400° C. to manufacture oxide fuel pellets that are adequate for nuclear fuel specification.

SUMMARY OF THE INVENTION

Embodiments of the present invention are directed to provide a method for manufacturing oxide fuel pellets and oxide fuel pellets manufactured thereby.

According to an aspect of the present invention, there is provided a method for manufacturing oxide fuel pellets, the method including: (step 1) preparing nuclear fuel powder containing uranium dioxide ($UO_{2+x}$, x=0 to 0.20); (step 2) compacting the nuclear fuel powder prepared in step 1 to manufacture green pellets; sintering the green pellets manufactured in step 2 at a temperature of about 1,200° C. to about 1,400° C. by using an atmosphere gas; and reducing the green pellets sintered in step 3 at a temperature of about 800° C. to about 1,000° C. by using a reducing atmosphere gas.

According to another aspect of the present invention, there is provided oxide fuel pellets manufactured by the above-described method.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph of a time-dependent temperature variation in a manufacturing method according to the present invention;

FIGS. 2 and 3 are graphs illustrating compaction pressure-dependent sintering densities of oxide fuel pellets manufactured according to Embodiments 1 to 18 of the prevent invention and Comparative Examples 1 to 12;

FIG. 4 is a graph illustrating sintering temperature-dependent grain sizes of the oxide fuel pellets manufactured according to Embodiments 1 to 18 of the prevent invention and Comparative Examples 1 to 12;

FIGS. 5 and 6 are graphs illustrating compaction pressure-dependent sintering densities of oxide fuel pellets manufactured according to Embodiments 19 to 36 of the prevent invention and Comparative Examples 13 to 24;

FIG. 7 is a graph illustrating sintering temperature-dependent grain sizes of the oxide fuel pellets manufactured according to Embodiments 19 to 36 of the prevent invention and Comparative Examples 13 to 24;

FIGS. 8 and 9 are graphs illustrating compaction pressure-dependent sintering densities of oxide fuel pellets manufactured according to Embodiments 37 to 54 of the prevent invention and Comparative Examples 25 to 36; and FIG. 10 is a graph illustrating sintering temperature-dependent grain sizes of the oxide fuel pellets manufactured according to Embodiments 37 to 54 of the prevent invention and Comparative Examples 25 to 36.

DESCRIPTION OF THE PREFERRED EMBODIMENTS

The present invention provides a method for manufacturing oxide fuel pellets. The method for manufacturing the oxide fuel pellets includes a process (step 1) of preparing nuclear fuel powder containing uranium dioxide ($UO_{2+x}$, x=0 to 0.20), a process (step 2) of compacting the nuclear fuel powder prepared in step 1 to manufacture green pellets, a process (step 3) of sintering the green pellets manufactured in step 2 at a temperature of about 1,200° C. to about 1,400° C. by using an atmosphere gas, and a process (step 4) of reducing the green pellets sintered in step 3 at a temperature of about 800° C. to about 1,000° C. by using a reducing atmosphere gas.

The present invention provides a low-temperature sintering reduction method for adjusting the oxide fuel pellets, which are used as a nuclear fuel and fed into a nuclear power plant, to be adequate for nuclear fuel specification. The oxide fuel pellets that are adequate for the nuclear fuel specification may have a sintering density ranging from about 94.0% to about 96.5% of a theoretical density (T.D) and a grain size of about 5 μm to about 25 μm.

Hereinafter, the method for manufacturing the oxide fuel pellets in each of the processes according to the present invention will be described in detail.

First, in the method for manufacturing the oxide fuel pellets according to the present invention, step 1 may be a process of preparing nuclear fuel powder containing uranium dioxide ($UO_{2+x}$, x=0 to 0.20).

In step 1, nuclear fuel powder containing uranium dioxide manufactured in a wet or dry manner is prepared as a raw material for manufacturing the oxide fuel pellets.

Particularly, in step 1, the nuclear fuel powder may be prepared by performing a pretreatment process. In one example of the pretreatment process of the nuclear fuel powder, to improve fluidity of the uranium dioxide ($UO_{2+x}$, x=0 to 0.20) manufactured in a wet or dry manner, a preliminary compaction process is performed at a predetermined pressure (about 300 MPa or less) to form preliminary slug, and then, the slug passes through a granulator having a sieve with a diameter of about 1 mm or less to form granules having a particle size of about 1 mm or less. Since the nuclear fuel powder that is formed with the granules through the above-described pretreatment process has good fluidity, the granules having a predetermined particle size may be manufactured. Also, an amount of lubricant may be mixed with the granules to reduce frication between granules and friction between the granules and a die wall, thereby prevent cracks from occurring.

Here, the nuclear fuel powder manufactured in step 1 may further contain gadolinia ($Gd_2O_3$) or plutonium oxide ($PuO_2$). Although the nuclear fuel powder contains only the uranium dioxide to manufacture the uranium dioxide fuel pellets, if the nuclear fuel powder containing burnable poison such as gadolinia ($Gd_2O_3$) is used as described above, mixed oxide fuel pellets such as $UO_2$—$Gd_2O_3$ may be manufactured. Also, when the nuclear fuel powder contains the nuclear fission material such as plutonium oxide ($PuO_2$), mixed oxide fuel pellets such as $UO_2$—$PuO_2$ may be manufactured.

Next, in the method for manufacturing the oxide fuel pellets according to the present invention, step 2 may be a process for compacting the nuclear fuel powder prepared in step 1 to manufacture the green pellets.

Particularly, the process of manufacturing the green pellets in step 2 may be performed under a compaction pressure of about 100 MPa to about 500 MPa. If the process of manufacturing the green pellets in step 2 is performed under a compaction pressure of about 100 MPa or less, it may be difficult to deal with the green pellets due to their weak properties and obtain a sintering density that is used for the oxide fuel pellets. On the other hand, if the process of manufacturing the green pellets is performed under a compaction pressure of about 500 MPa or more, it may be difficult to manufacture the green pellets, involve the possibility of an occurrence of cracks, and increase a sintering density corresponding to the increase in the compaction pressure.

The compaction in step 2 may be performed through the conventional method. The green pellets manufactured by the compaction process may have an annular, solid, or rectangular shape that is adequate for the following process.

Next, in the method for manufacturing the oxide fuel pellets according to the present invention, step 3 may be a process for sintering the green pellets manufactured in step 2 at a temperature of about 1,200° C. to about 1,400° C. by using an atmosphere gas.

To manufacture the oxide fuel pellets adequate from the nuclear fuel specification in the related art, the green pellets are sintered at a high temperature (about 1,600° C. or more) for two hours or more under a hydrogen atmosphere. However, when the green pellets are sintered at a high temperature under the hydrogen atmosphere as described above, the risk of explosion of hydrogen may be involved. Also, electricity may be excessively consumed due to the sintering at the high temperature, and thus, the above-described manufacturing process may be uneconomical. Also, in the low-temperature sintering method according to the related art, the sintering process is performed at a low temperature (about 1,400° C. or less) under an atmosphere in which a ratio of carbon dioxide/carbon monoxide is adjusted. However, in the low-temperature sintering method, it may be difficult to adjust the ratio of carbon dioxide/carbon monoxide, and thus it may be difficult to manufacture oxide fuel pellets that are adequate for the nuclear fuel specification.

For this, in step 3, the green pellets are sintered at a temperature of about 1,200° C. to 1,400° C. by using the atmosphere gas. In step 4 that is the next process, the sintered green pellets are reduced by using the reducing atmosphere gas to manufacture the oxide fuel pellets that are adequate for the nuclear fuel specification.

Particularly, the sintering in step 3 may be performed under a gas atmosphere of carbon dioxide, nitrogen, or argon. When the sintering in step 3 is performed under the oxidative gas atmosphere such as carbon dioxide or the inert gas atmosphere such as nitrogen or argon, since an O/U ratio of the uranium dioxide power manufactured in the wet or dry manner is about 2.15, excessive oxygen may exist. Thus, the excessive oxygen may promote the sintering to increase the sintering density and grain size. On the other hand, when the sintering in step 3 is performed under the hydrogen gas atmosphere, the existing excessive oxygen may be reduced and thus do not exist. Thus, to obtain the desired sintering density and grain size, the sintering may be performed at a high temperature of about 1600° C. or more. When the sintering is performed under the oxidative gas atmosphere such as the carbon dioxide ($CO_2$) than the inert gas atmosphere such as nitrogen or argon, the gas atmosphere may be oxidized to further increase the sintering density and grain size. However, since the oxidative gas atmosphere such as the carbon dioxide causes global warming, when the sintering is performed by using nitrogen or argon, the sintering process may be environmentally friendly.

Also, the sintering in step 3 may be performed for about 2 hours or more, more preferably, about 2 hours to about 8 hours. If when the sintering in step 3 is performed for about 2 hours or less, the manufactured oxide fuel pellets may not be suitable in grain size for the nuclear fuel specification.

Next, in the method for manufacturing the oxide fuel pellets according to the present invention, step 4 may be a process for reducing the green pellets sintered in step 3 at a temperature of about 800° C. to about 1,000° C. by using a reducing atmosphere gas.

Since the green pellets sintered in step 3 do not have an O/U ratio of about 2.00 that is required for the nuclear fuel specification, the green pellets may be reduced at a temperature of about 800° C. to about 1,000° C. by using the reducing gas atmosphere while being cooled after the sintering to reduce the green pellets into $UO_2$. Thus, the $UO_2$ oxide fuel pellets may be manufactured from $UO_{2+x}$ through the reduction process.

As the reduction in step 4 is performed, high-quality $UO_2$ oxide fuel pellets without having cracks may be manufactured. Here, since the manufactured $UO_2$ oxide fuel pellets have an O/U ratio of about 2.0, the $UO_2$ oxide fuel pellets may be superior in quality.

Although the reduction in step 4 is performed at the temperature of about 800° C. to about 1,000° C. for about 1 hour to about 5 hours, the present invention is not limited thereto.

The sintering and reduction in steps 3 and 4 may be continuously performed. That is, after the sintering in step 3 is performed, a hydrogen gas may be injected to convert the gas atmosphere into the reducing atmosphere. Thus, the sintering and reduction may be continuously performed without intermission.

Here, when the sintering is performed under the atmosphere gas such as carbon dioxide, nitrogen, or argon, the hydrogen gas may be immediately injected to create the reducing atmosphere.

In an example of the sintering and reduction processes according to the present invention, as schematically illustrated in FIG. 1, the method for manufacturing the oxide fuel pellets according to the present invention performs the low-temperature sintering process at a temperature of about 1,200° C. to 1,400° C. under the activated gas atmosphere or inert gas atmosphere to convert the gas atmosphere into the reducing gas atmosphere while performing the cooling process, thereby performing the reduction process at a temperature of about 800° C. to about 1,000° C. As a result, the oxide fuel pellets that are adequate for the nuclear fuel specification may be manufactured.

Also, the present invention may provide the oxide fuel pellets manufactured by the above-described method.

The oxide fuel pellets manufactured according to the present invention may be suitable for the oxide fuel pellets that are adequate for the nuclear fuel specification. In the related art, to manufacture the oxide fuel pellets that are adequate for the nuclear fuel specification, the oxide fuel pellets may be sintered at a high temperature (about 1,600° C. or more) for about 2 hours or more under the hydrogen atmosphere or may be sintered at a low temperature (about 1,400° C. or less) under an atmosphere in which a ratio of carbon dioxide/carbon monoxide is adjusted. However, the manufacturing methods may have low economic feasibility and stability, and it may be difficult to adjust the ratio of the atmosphere gas.

On the other hand, the oxide fuel pellets manufactured by the above-described method according to the present invention may be sintered at a temperature of about 1,200° C. to about 1,400° C. to solve the above-described low economic feasibility and stability. Also, since the oxide fuel pellets are manufactured under the single gas atmosphere, the manufacturing process may be easy.

Here, the oxide fuel pellets may have a density ranging from about 94.0% to about 96.5% of a theoretical density (T.D) and a grain size of about 5 μm to about 25 μm. Thus, the oxide fuel pellets may be suitable for the oxide fuel pellets that are adequate for the nuclear fuel specification.

Hereinafter, following embodiments and experimental examples according to the present invention will be described in detail.

However, the following embodiments and experimental examples may be exemplified merely as illustrative purpose, and thus the technical scope of the present invention is not limited thereto.

<Embodiment 1> Manufacture 1 of Oxide Fuel Pellet

Step 1: Natural uranium dioxide powder (ex-ADU $UO_2$, specific surface area: 5.72 $m^2/g$, O/U ratio: 2.13) manufactured in a wet manner was prepared.

Step 2: The uranium dioxide prepared in step 1 may be pressed at a pressure of about 150 MPa by using a hydraulic press to manufacture green pellets. Here, each of the green pellets has a diameter of about 10.0 mm, a length of about 10 mm, and a weight of about 3.6 g to about 4.5 g. Also, the green pellet has a density of about 42% to about 43%.

Step 3: The green pellets manufactured in step 2 were sintered at a temperature of about 1,200° C. with a heating rate of about 4° C./minute for about 2 hours under a carbon dioxide ($CO_2$) atmosphere.

Step 4: After step 3 is performed, the green pellets were cooled up to a temperature of about 1,000° C. with a cooling rate of about 4° C./minute, and then the carbon dioxide was replaced with a hydrogen gas to perform a reduction process for 2 hours to manufacture oxide fuel pellets.

<Embodiment 2> Manufacture 2 of Oxide Fuel Pellet

The same process as Embodiment 1 except that the uranium dioxide powder is pressed at a pressure of about 300 MPa by using the hydraulic press in step 2 of Embodiment 1 was performed to manufacture oxide fuel pellets. When the green pellets are manufactured at the pressure of about 300 MPa, a green density was about 48% to about 49% of the theoretical density.

<Embodiment 3> Manufacture 3 of Oxide Fuel Pellet

The same process as Embodiment 1 except that the uranium dioxide powder is pressed at a pressure of about 450 MPa by using the hydraulic press in step 2 of Embodiment 1 was performed to manufacture oxide fuel pellets. When the green pellets are manufactured at the pressure of about 450 MPa, a green density was about 52% to about 53% of the theoretical density.

<Embodiment 4> Manufacture 4 of Oxide Fuel Pellet

The same process as Embodiment 1 except that the green pellets are sintered for about 5 hours in step 3 of Embodiment 1 was performed to manufacture oxide fuel pellets.

<Embodiment 5> Manufacture 5 of Oxide Fuel Pellet

The same process as Embodiment 4 except that the uranium dioxide powder is pressed at a pressure of about 300 MPa by using the hydraulic press in step 2 of Embodiment 4 was performed to manufacture oxide fuel pellets.

<Embodiment 6> Manufacture 6 of Oxide Fuel Pellet

The same process as Embodiment 4 except that the uranium dioxide powder is pressed at a pressure of about 450 MPa by using the hydraulic press in step 2 of Embodiment 4 was performed to manufacture oxide fuel pellets.

<Embodiment 7> Manufacture 7 of Oxide Fuel Pellet

The same process as Embodiment 1 except that the green pellets are sintered at a temperature of about 1,300° C. in step 3 of Embodiment 1 was performed to manufacture oxide fuel pellets.

<Embodiment 8> Manufacture 8 of Oxide Fuel Pellet

The same process as Embodiment 7 except that the uranium dioxide powder is pressed at a pressure of about 300 MPa by using the hydraulic press in step 2 of Embodiment 7 was performed to manufacture oxide fuel pellets.

<Embodiment 9> Manufacture 9 of Oxide Fuel Pellet

The same process as Embodiment 7 except that the uranium dioxide powder is pressed at a pressure of about 450 MPa by using the hydraulic press in step 2 of Embodiment 7 was performed to manufacture oxide fuel pellets.

<Embodiment 10> Manufacture 10 of Oxide Fuel Pellet

The same process as Embodiment 7 except that the green pellets are sintered for about 5 hours in step 3 of Embodiment 7 was performed to manufacture oxide fuel pellets.

<Embodiment 11> Manufacture 11 of Oxide Fuel Pellet

The same process as Embodiment 10 except that the uranium dioxide powder is pressed at a pressure of about 300 MPa by using the hydraulic press in step 2 of Embodiment 10 was performed to manufacture oxide fuel pellets.

<Embodiment 12> Manufacture 12 of Oxide Fuel Pellet

The same process as Embodiment 10 except that the uranium dioxide powder is pressed at a pressure of about 450 MPa by using the hydraulic press in step 2 of Embodiment 10 was performed to manufacture oxide fuel pellets.

<Embodiment 13> Manufacture 13 of Oxide Fuel Pellet

The same process as Embodiment 1 except that the green pellets are sintered at a temperature of about 1,400° C. in step 3 of Embodiment 1 was performed to manufacture oxide fuel pellets.

<Embodiment 14> Manufacture 14 of Oxide Fuel Pellet

The same process as Embodiment 13 except that the uranium dioxide powder is pressed at a pressure of about 300 MPa by using the hydraulic press in step 2 of Embodiment 13 was performed to manufacture oxide fuel pellets.

<Embodiment 15> Manufacture 15 of Oxide Fuel Pellet

The same process as Embodiment 13 except that the uranium dioxide powder is pressed at a pressure of about 450 MPa by using the hydraulic press in step 2 of Embodiment 13 was performed to manufacture oxide fuel pellets.

<Embodiment 16> Manufacture 16 of Oxide Fuel Pellet

The same process as Embodiment 13 except that the green pellets are sintered for about 5 hours in step 3 of Embodiment 13 was performed to manufacture oxide fuel pellets.

<Embodiment 17> Manufacture 17 of Oxide Fuel Pellet

The same process as Embodiment 16 except that the uranium dioxide powder is pressed at a pressure of about 300 MPa by using the hydraulic press in step 2 of Embodiment 16 was performed to manufacture oxide fuel pellets.

<Embodiment 18> Manufacture 18 of Oxide Fuel Pellet

The same process as Embodiment 16 except that the uranium dioxide powder is pressed at a pressure of about 450 MPa by using the hydraulic press in step 2 of Embodiment 16 was performed to manufacture oxide fuel pellets.

<Embodiment 19> Manufacture 19 of Oxide Fuel Pellet

The same process as Embodiment 1 except that the green pellets are not sintered under carbon dioxide ($CO_2$) atmosphere, but sintered under an argon (Ar) atmosphere in step 3 of Embodiment 1 was performed to manufacture oxide fuel pellets.

<Embodiment 20> Manufacture 20 of Oxide Fuel Pellet

The same process as Embodiment 19 except that the uranium dioxide powder is pressed at a pressure of about 300 MPa by using the hydraulic press in step 2 of Embodiment 19 was performed to manufacture oxide fuel pellets.

<Embodiment 21> Manufacture 21 of Oxide Fuel Pellet

The same process as Embodiment 19 except that the uranium dioxide powder is pressed at a pressure of about 450 MPa by using the hydraulic press in step 2 of Embodiment 19 was performed to manufacture oxide fuel pellets.

<Embodiment 22> Manufacture 22 of Oxide Fuel Pellet

The same process as Embodiment 19 except that the green pellets are sintered for about 5 hours in step 3 of Embodiment 19 was performed to manufacture oxide fuel pellets.

<Embodiment 23> Manufacture 23 of Oxide Fuel Pellet

The same process as Embodiment 22 except that the uranium dioxide powder is pressed at a pressure of about 300 MPa by using the hydraulic press in step 2 of Embodiment 22 was performed to manufacture oxide fuel pellets.

<Embodiment 24> Manufacture 24 of Oxide Fuel Pellet

The same process as Embodiment 22 except that the uranium dioxide powder is pressed at a pressure of about 450 MPa by using the hydraulic press in step 2 of Embodiment 22 was performed to manufacture oxide fuel pellets.

<Embodiment 25> Manufacture 25 of Oxide Fuel Pellet

The same process as Embodiment 19 except that the green pellets are sintered at a temperature of about 1,300° C. in step 3 of Embodiment 19 was performed to manufacture oxide fuel pellets.

<Embodiment 26> Manufacture 26 of Oxide Nuclear Pellet

The same process as Embodiment 25 except that the uranium dioxide powder is pressed at a pressure of about 300 MPa by using the hydraulic press in step 2 of Embodiment 25 was performed to manufacture oxide fuel pellets.

<Embodiment 27> Manufacture 27 of Oxide Fuel Pellet

The same process as Embodiment 25 except that the uranium dioxide powder is pressed at a pressure of about 450 MPa by using the hydraulic press in step 2 of Embodiment 25 was performed to manufacture oxide fuel pellets.

<Embodiment 28> Manufacture 28 of Oxide Fuel Pellet

The same process as Embodiment 25 except that the green pellets are sintered for about 5 hours in step 3 of Embodiment 25 was performed to manufacture oxide fuel pellets.

<Embodiment 29> Manufacture 29 of Oxide Fuel Pellet

The same process as Embodiment 28 except that the uranium dioxide powder is pressed at a pressure of about 300 MPa by using the hydraulic press in step 2 of Embodiment 28 was performed to manufacture oxide fuel pellets.

<Embodiment 30> Manufacture 30 of Oxide Fuel Pellet

The same process as Embodiment 28 except that the uranium dioxide powder is pressed at a pressure of about 450 MPa by using the hydraulic press in step 2 of Embodiment 28 was performed to manufacture oxide fuel pellets.

<Embodiment 31> Manufacture 31 of Oxide Fuel Pellet

The same process as Embodiment 19 except that the green pellets are sintered at a temperature of about 1,400° C. in step 3 of Embodiment 19 was performed to manufacture oxide fuel pellets.

<Embodiment 23> Manufacture 32 of Oxide Fuel Pellet

The same process as Embodiment 31 except that the uranium dioxide powder is pressed at a pressure of about 300 MPa by using the hydraulic press in step 2 of Embodiment 31 was performed to manufacture oxide fuel pellets.

<Embodiment 33> Manufacture 33 of Oxide Fuel Pellet

The same process as Embodiment 31 except that the uranium dioxide powder is pressed at a pressure of about 450 MPa by using the hydraulic press in step 2 of Embodiment 31 was performed to manufacture oxide fuel pellets.

<Embodiment 34> Manufacture 34 of Oxide Fuel Pellet

The same process as Embodiment 31 except that the green pellets are sintered for about 5 hours in step 3 of Embodiment 31 was performed to manufacture oxide fuel pellets.

<Embodiment 35> Manufacture 35 of Oxide Fuel Pellet

The same process as Embodiment 34 except that the uranium dioxide powder is pressed at a pressure of about 300 MPa by using the hydraulic press in step 2 of Embodiment 34 was performed to manufacture oxide fuel pellets.

<Embodiment 36> Manufacture 36 of Oxide Fuel Pellet

The same process as Embodiment 34 except that the uranium dioxide powder is pressed at a pressure of about 450 MPa by using the hydraulic press in step 2 of Embodiment 34 was performed to manufacture oxide fuel pellets.

<Embodiment 37> Manufacture 37 of Oxide Fuel Pellet

The same process as Embodiment 1 except that the green pellets are not sintered under carbon dioxide ($CO_2$) atmosphere, but sintered under a nitrogen (N2) atmosphere in step 3 of Embodiment 1 was performed to manufacture oxide fuel pellets.

<Embodiment 38> Manufacture 38 of Oxide Fuel Pellet

The same process as Embodiment 37 except that the uranium dioxide powder is pressed at a pressure of about 300 MPa by using the hydraulic press in step 2 of Embodiment 37 was performed to manufacture oxide fuel pellets.

<Embodiment 39> Manufacture 39 of Oxide Fuel Pellet

The same process as Embodiment 37 except that the uranium dioxide powder is pressed at a pressure of about 450 MPa by using the hydraulic press in step 2 of Embodiment 37 was performed to manufacture oxide fuel pellets.

<Embodiment 40> Manufacture 40 of Oxide Fuel Pellet

The same process as Embodiment 37 except that the green pellets are sintered for about 5 hours in step 3 of Embodiment 37 was performed to manufacture oxide fuel pellets.

<Embodiment 41> Manufacture 41 of Oxide Fuel Pellet

The same process as Embodiment 40 except that the uranium dioxide powder is pressed at a pressure of about 300 MPa by using the hydraulic press in step 2 of Embodiment 40 was performed to manufacture oxide fuel pellets.

<Embodiment 42> Manufacture 42 of Oxide Fuel Pellet

The same process as Embodiment 40 except that the uranium dioxide powder is pressed at a pressure of about 450 MPa by using the hydraulic press in step 2 of Embodiment 40 was performed to manufacture oxide fuel pellets.

<Embodiment 43> Manufacture 43 of Oxide Fuel Pellet

The same process as Embodiment 37 except that the green pellets are sintered at a temperature of about 1,300° C. in step 3 of Embodiment 37 was performed to manufacture oxide fuel pellets.

<Embodiment 44> Manufacture 44 of Oxide Nuclear Fuel Pellet

The same process as Embodiment 43 except that the uranium dioxide powder is pressed at a pressure of about 300 MPa by using the hydraulic press in step 2 of Embodiment 43 was performed to manufacture oxide fuel pellets.

<Embodiment 45> Manufacture 45 of Oxide Fuel Pellet

The same process as Embodiment 43 except that the uranium dioxide powder is pressed at a pressure of about 450 MPa by using the hydraulic press in step 2 of Embodiment 43 was performed to manufacture oxide fuel pellets.

<Embodiment 46> Manufacture 46 of Oxide Fuel Pellet

The same process as Embodiment 43 except that the green pellets are sintered for about 5 hours in step 3 of Embodiment 43 was performed to manufacture oxide fuel pellets.

<Embodiment 47> Manufacture 47 of Oxide Fuel Pellet

The same process as Embodiment 46 except that the uranium dioxide powder is pressed at a pressure of about 300 MPa by using the hydraulic press in step 2 of Embodiment 46 was performed to manufacture oxide fuel pellets.

<Embodiment 48> Manufacture 48 of Oxide Fuel Pellet

The same process as Embodiment 46 except that the uranium dioxide powder is pressed at a pressure of about 450 MPa by using the hydraulic press in step 2 of Embodiment 46 was performed to manufacture oxide fuel pellets.

<Embodiment 49> Manufacture 49 of Oxide Fuel Pellet

The same process as Embodiment 37 except that the green pellets are sintered at a temperature of about 1,400° C. in step 3 of Embodiment 37 was performed to manufacture oxide fuel pellets.

<Embodiment 50> Manufacture 50 of Oxide Fuel Pellet

The same process as Embodiment 49 except that the uranium dioxide powder is pressed at a pressure of about 300 MPa by using the hydraulic press in step 2 of Embodiment 49 was performed to manufacture oxide fuel pellets.

<Embodiment 51> Manufacture 51 of Oxide Fuel Pellet

The same process as Embodiment 49 except that the uranium dioxide powder is pressed at a pressure of about 450 MPa by using the hydraulic press in step 2 of Embodiment 49 was performed to manufacture oxide fuel pellets.

<Embodiment 52> Manufacture 52 of Oxide Fuel Pellet

The same process as Embodiment 49 except that the green pellets are sintered for about 5 hours in step 3 of Embodiment 49 was performed to manufacture oxide fuel pellets.

<Embodiment 53> Manufacture 53 of Oxide Fuel Pellet

The same process as Embodiment 52 except that the uranium dioxide powder is pressed at a pressure of about 300 MPa by using the hydraulic press in step 2 of Embodiment 52 was performed to manufacture oxide fuel pellets.

<Embodiment 54> Manufacture 54 of Oxide Fuel Pellet

The same process as Embodiment 52 except that the uranium dioxide powder is pressed at a pressure of about 450 MPa by using the hydraulic press in step 2 of Embodiment 52 was performed to manufacture oxide fuel pellets.

Comparative Example 1

The same process as Embodiment 1 except that the green pellets are sintered at a temperature of about 1,000° C. in step 3 of Embodiment 1 was performed to manufacture oxide fuel pellets.

Comparative Example 2

The same process as Comparative Example 1 except that the uranium dioxide powder is pressed at a pressure of about 300 MPa by using the hydraulic press in step 2 of Comparative Example 1 was performed to manufacture oxide fuel pellets.

Comparative Example 3

The same process as Comparative Example 1 except that the uranium dioxide powder is pressed at a pressure of about 450 MPa by using the hydraulic press in step 2 of Comparative Example 1 was performed to manufacture oxide fuel pellets.

Comparative Example 4

The same process as Comparative Example 1 except that the green pellets are sintered for about 5 hours in step 3 of Comparative Example 1 was performed to manufacture oxide fuel pellets.

Comparative Example 5

The same process as Comparative Example 4 except that the uranium dioxide powder is pressed at a pressure of about 300 MPa by using the hydraulic press in step 2 of Comparative Example 4 was performed to manufacture oxide fuel pellets.

Comparative Example 6

The same process as Comparative Example 4 except that the uranium dioxide powder is pressed at a pressure of about 450 MPa by using the hydraulic press in step 2 of Comparative Example 4 was performed to manufacture oxide fuel pellets.

Comparative Example 7

The same process as Embodiment 1 except that the green pellets are sintered at a temperature of about 1,100° C. in step 3 of Embodiment 1 was performed to manufacture oxide fuel pellets.

Comparative Example 8

The same process as Comparative Example 7 except that the uranium dioxide powder is pressed at a pressure of about 300 MPa by using the hydraulic press in step 2 of Comparative Example 7 was performed to manufacture oxide fuel pellets.

Comparative Example 9

The same process as Comparative Example 7 except that the uranium dioxide powder is pressed at a pressure of about 450 MPa by using the hydraulic press in step 2 of Comparative Example 7 was performed to manufacture oxide fuel pellets.

Comparative Example 10

The same process as Comparative Example 7 except that the green pellets are sintered for about 5 hours in step 3 of Comparative Example 7 was performed to manufacture oxide fuel pellets.

Comparative Example 11

The same process as Comparative Example 10 except that the uranium dioxide powder is pressed at a pressure of about 300 MPa by using the hydraulic press in step 2 of Comparative Example 10 was performed to manufacture oxide fuel pellets.

Comparative Example 12

The same process as Comparative Example 10 except that the uranium dioxide powder is pressed at a pressure of about 450 MPa by using the hydraulic press in step 2 of Comparative Example 10 was performed to manufacture oxide fuel pellets.

Comparative Example 13

The same process as Embodiment 19 except that the green pellets are sintered at a temperature of about 1,000° C. in step 3 of Embodiment 19 was performed to manufacture oxide fuel pellets.

Comparative Example 14

The same process as Comparative Example 13 except that the uranium dioxide powder is pressed at a pressure of about 300 MPa by using the hydraulic press in step 2 of Comparative Example 13 was performed to manufacture oxide fuel pellets.

Comparative Example 15

The same process as Comparative Example 13 except that the uranium dioxide powder is pressed at a pressure of about 450 MPa by using the hydraulic press in step 2 of Comparative Example 13 was performed to manufacture oxide fuel pellets.

Comparative Example 16

The same process as Comparative Example 13 except that the green pellets are sintered for about 5 hours in step 3 of Comparative Example 13 was performed to manufacture oxide fuel pellets.

Comparative Example 17

The same process as Comparative Example 16 except that the uranium dioxide powder is pressed at a pressure of about 300 MPa by using the hydraulic press in step 2 of Comparative Example 16 was performed to manufacture oxide fuel pellets.

Comparative Example 18

The same process as Comparative Example 16 except that the uranium dioxide powder is pressed at a pressure of about 450 MPa by using the hydraulic press in step 2 of Comparative Example 16 was performed to manufacture oxide fuel pellets.

Comparative Example 19

The same process as Embodiment 19 except that the green pellets are sintered at a temperature of about 1,100° C. in step 3 of Embodiment 19 was performed to manufacture oxide fuel pellets.

Comparative Example 20

The same process as Comparative Example 19 except that the uranium dioxide powder is pressed at a pressure of about 300 MPa by using the hydraulic press in step 2 of Comparative Example 19 was performed to manufacture oxide fuel pellets.

Comparative Example 21

The same process as Comparative Example 19 except that the uranium dioxide powder is pressed at a pressure of about 450 MPa by using the hydraulic press in step 2 of Comparative Example 19 was performed to manufacture oxide fuel pellets.

Comparative Example 22

The same process as Comparative Example 19 except that the green pellets are sintered for about 5 hours in step 3 of Comparative Example 19 was performed to manufacture oxide fuel pellets.

Comparative Example 23

The same process as Comparative Example 22 except that the uranium dioxide powder is pressed at a pressure of about 300 MPa by using the hydraulic press in step 2 of Comparative Example 22 was performed to manufacture oxide fuel pellets.

Comparative Example 24

The same process as Comparative Example 22 except that the uranium dioxide powder is pressed at a pressure of about 450 MPa by using the hydraulic press in step 2 of Comparative Example 22 was performed to manufacture oxide fuel pellets.

Comparative Example 25

The same process as Embodiment 37 except that the green pellets are sintered at a temperature of about 1,000° C. in step 3 of Embodiment 37 was performed to manufacture oxide fuel pellets.

Comparative Example 26

The same process as Comparative Example 25 except that the uranium dioxide powder is pressed at a pressure of about 300 MPa by using the hydraulic press in step 2 of Comparative Example 25 was performed to manufacture oxide fuel pellets.

Comparative Example 27

The same process as Comparative Example 25 except that the uranium dioxide powder is pressed at a pressure of about 450 MPa by using the hydraulic press in step 2 of Comparative Example 25 was performed to manufacture oxide fuel pellets.

Comparative Example 28

The same process as Comparative Example 25 except that the green pellets are sintered for about 5 hours in step 3 of Comparative Example 25 was performed to manufacture oxide fuel pellets.

Comparative Example 29

The same process as Comparative Example 28 except that the uranium dioxide powder is pressed at a pressure of about 300 MPa by using the hydraulic press in step 2 of Comparative Example 28 was performed to manufacture oxide fuel pellets.

Comparative Example 30

The same process as Comparative Example 28 except that the uranium dioxide powder is pressed at a pressure of about 450 MPa by using the hydraulic press in step 2 of Comparative Example 28 was performed to manufacture oxide fuel pellets.

Comparative Example 31

The same process as Embodiment 37 except that the green pellets are sintered at a temperature of about 1,100° C. in step 3 of Embodiment 37 was performed to manufacture oxide fuel pellets.

Comparative Example 32

The same process as Comparative Example 31 except that the uranium dioxide powder is pressed at a pressure of about 300 MPa by using the hydraulic press in step 2 of Comparative Example 31 was performed to manufacture oxide fuel pellets.

Comparative Example 33

The same process as Comparative Example 31 except that the uranium dioxide powder is pressed at a pressure of about 450 MPa by using the hydraulic press in step 2 of Comparative Example 31 was performed to manufacture oxide fuel pellets.

Comparative Example 34

The same process as Comparative Example 31 except that the green pellets are sintered for about 5 hours in step 3 of Comparative Example 31 was performed to manufacture oxide fuel pellets.

Comparative Example 35

The same process as Comparative Example 34 except that the uranium dioxide powder is pressed at a pressure of about 300 MPa by using the hydraulic press in step 2 of Comparative Example 34 was performed to manufacture oxide fuel pellets.

Comparative Example 36

The same process as Comparative Example 34 except that the uranium dioxide powder is pressed at a pressure of about 450 MPa by using the hydraulic press in step 2 of Comparative Example 34 was performed to manufacture oxide fuel pellets.

TABLE 1

| Classification | Atmosphere gas | Temperature (° C.) | Pressure (MPa) | Time |
|---|---|---|---|---|
| Embodiment 1 | Carbon dioxide ($CO_2$) | 1200 | 150 | 2 |
| Embodiment 2 | | | 300 | |
| Embodiment 3 | | | 450 | |
| Embodiment 4 | | | 150 | 5 |
| Embodiment 5 | | | 300 | |
| Embodiment 6 | | | 450 | |
| Embodiment 7 | | 1300 | 150 | 2 |
| Embodiment 8 | | | 300 | |
| Embodiment 9 | | | 450 | |
| Embodiment 10 | | | 150 | 5 |
| Embodiment 11 | | | 300 | |
| Embodiment 12 | | | 450 | |
| Embodiment 13 | | 1400 | 150 | 2 |
| Embodiment 14 | | | 300 | |
| Embodiment 15 | | | 450 | |
| Embodiment 16 | | | 150 | 5 |
| Embodiment 17 | | | 300 | |
| Embodiment 18 | | | 450 | |

TABLE 2

| Classification | Atmosphere gas | Temperature (° C.) | Pressure (MPa) | Time |
|---|---|---|---|---|
| Embodiment 19 | Argon (Ar) | 1200 | 150 | 2 |
| Embodiment 20 | | | 300 | |
| Embodiment 21 | | | 450 | |
| Embodiment 22 | | | 150 | 5 |
| Embodiment 23 | | | 300 | |
| Embodiment 24 | | | 450 | |
| Embodiment 25 | | 1300 | 150 | 2 |
| Embodiment 26 | | | 300 | |
| Embodiment 27 | | | 450 | |
| Embodiment 28 | | | 150 | 5 |
| Embodiment 29 | | | 300 | |
| Embodiment 30 | | | 450 | |
| Embodiment 31 | | 1400 | 150 | 2 |
| Embodiment 32 | | | 300 | |
| Embodiment 33 | | | 450 | |
| Embodiment 34 | | | 150 | 5 |
| Embodiment 35 | | | 300 | |
| Embodiment 36 | | | 450 | |

TABLE 3

| Classification | Atmosphere gas | Temperature (° C.) | Pressure (MPa) | Time |
|---|---|---|---|---|
| Embodiment 37 | Nitrogen (N2) | 1200 | 150 | 2 |
| Embodiment 38 | | | 300 | |
| Embodiment 39 | | | 450 | |
| Embodiment 40 | | | 150 | 5 |
| Embodiment 41 | | | 300 | |
| Embodiment 42 | | | 450 | |
| Embodiment 43 | | 1300 | 150 | 2 |
| Embodiment 44 | | | 300 | |
| Embodiment 45 | | | 450 | |
| Embodiment 46 | | | 150 | 5 |
| Embodiment 47 | | | 300 | |
| Embodiment 48 | | | 450 | |
| Embodiment 49 | | 1400 | 150 | 2 |
| Embodiment 50 | | | 300 | |
| Embodiment 51 | | | 450 | |
| Embodiment 52 | | | 150 | 5 |
| Embodiment 53 | | | 300 | |
| Embodiment 54 | | | 450 | |

TABLE 4

| Classification | Atmosphere gas | Temperature (° C.) | Pressure (MPa) | Time |
|---|---|---|---|---|
| Comparative Example 1 | Carbon dioxide ($CO_2$) | 1000 | 150 | 2 |
| Comparative Example 2 | | | 300 | |
| Comparative Example 3 | | | 450 | |
| Comparative Example 4 | | | 150 | 5 |
| Comparative Example 5 | | | 300 | |
| Comparative Example 6 | | | 450 | |
| Comparative Example 7 | | 1100 | 150 | 2 |
| Comparative Example 8 | | | 300 | |
| Comparative Example 9 | | | 450 | |
| Comparative Example 10 | | | 150 | 5 |
| Comparative Example 11 | | | 300 | |
| Comparative Example 12 | | | 450 | |
| Comparative Example 13 | Argon (Ar) | 1000 | 150 | 2 |
| Comparative Example 14 | | | 300 | |
| Comparative Example 15 | | | 450 | |
| Comparative Example 16 | | | 150 | 5 |
| Comparative Example 17 | | | 300 | |
| Comparative Example 18 | | | 450 | |
| Comparative Example 19 | | 1100 | 150 | 2 |
| Comparative Example 20 | | | 300 | |
| Comparative Example 21 | | | 450 | |
| Comparative Example 22 | | | 150 | 5 |
| Comparative Example 23 | | | 300 | |
| Comparative Example 24 | | | 450 | |
| Comparative Example 25 | Nitrogen ($N_2$) | 1000 | 150 | 2 |
| Comparative Example 26 | | | 300 | |
| Comparative Example 27 | | | 450 | |
| Comparative Example 28 | | | 150 | 5 |
| Comparative Example 29 | | | 300 | |
| Comparative Example 30 | | | 450 | |
| Comparative Example 31 | | 1100 | 150 | 2 |
| Comparative Example 32 | | | 300 | |
| Comparative Example 33 | | | 450 | |
| Comparative Example 34 | | | 150 | 5 |
| Comparative Example 35 | | | 300 | |
| Comparative Example 36 | | | 450 | |

<Experimental Example 1> Analysis of Sintering Density and Grain Size of Oxide Fuel Pellet (1) Analysis of Sintering Density and Grain Size of Oxide Fuel Pellet Depending on Sintering Under Carbon Dioxide Atmosphere To confirm the sintering density and grain size of the oxide fuel pellets manufactured by the manufacturing method according to the present invention, sintering densities of the oxide fuel pellets manufactured in Embodiments 1 to 18 and Comparative Examples 1 to 12 were measured in an immersion method, grain sizes were measured in the Heyn's lineal intercept (ASTM E112) method, and their results were illustrated in FIGS. 2 to 4.

As illustrated in FIGS. 2 and 3, the oxide fuel pellets that are adequate for the nuclear fuel specification has a sintering density ranging from about 94.0% to about 96.5% of a theoretical density (T.D), and manufacturing conditions of the oxide fuel pellets having a density within the above-described sintering density range are as follows.

When a sintering time is about 2 hours, a compaction pressure is about 400 MPa or more in case of a sintering temperature of about 1,000° C., a compaction pressure is about 280 MPa or more in case of a sintering temperature of about 1,100° C., a compaction pressure is about 210 MPa or more in case of a sintering temperature of about 1,200° C., a compaction pressure is about 150 MPa or more in case of a sintering temperature of about 1,300° C., and a compaction pressure is about 420 MPa or less in case of a sintering temperature of about 1,400° C.

Also, when a sintering time is about 5 hours, a compaction pressure is about 300 MPa or more in case of a sintering temperature of about 1,000° C., a compaction pressure is about 210 MPa or more in case of a sintering temperature of about 1,100° C., a compaction pressure is about 150 MPa or more in case of a sintering temperature of about 1,200° C., a compaction pressure is about 150 MPa or more in case of a sintering temperature of about 1,300° C., and a compaction pressure is about 250 MPa or less in case of a sintering temperature of about 1,400° C.

Further, as illustrated in FIG. 4, it was confirmed that the oxide fuel pellets that are adequate for the nuclear fuel specification has a grain size of about 5 μm or more, and manufacturing conditions of the oxide fuel pellets having a grain size within the above-described grain size range are as follows: a temperature of about 1,200° C. or more and a sintering time of about 2 hours or more. Here, it was confirmed that the compaction pressure has a slight influence on the grain size.

As described above, conditions adequate for manufacturing the oxide nuclear fuel pellets, that are adequate for the nuclear fuel specification, having the conditions in which the theoretical density (T.D) of about 94.0% to about 96.5% and the grain size of about 5 μm or more are as follows.

When a sintering time is about 2 hours, a compaction pressure is about 210 MPa or more in case of a sintering temperature of about 1,200° C., a compaction pressure is about 150 MPa or more in case of a sintering temperature of about 1,300° C., and a compaction pressure is about 420 MPa or less in case of a sintering temperature of about 1,400° C. When a sintering time is about 5 hours, a compaction pressure is about 150 MPa or more in case of a sintering temperature of about 1,200° C., a compaction pressure is about 150 MPa or more in case of a sintering temperature of about 1,300° C., and a compaction pressure is about 250 MPa or less in case of a sintering temperature of about 1,400° C.

(2) Analysis of Sintering Density and Grain Size of Oxide Fuel Pellet Depending on Sintering Under Argon Atmosphere To confirm the sintering density and grain size of the oxide fuel pellets manufactured by the manufacturing method according to the present invention, sintering densities of the oxide fuel pellets manufactured in Embodiments 19 to 36 and Comparative Examples 13 to 24 were measured in an immersion method, grain sizes were measured in the Heyn's lineal intercept (ASTM E112) method, and their results were illustrated in FIGS. 5 to 7.

As illustrated in FIGS. 5 and 6, the oxide fuel pellets that are adequate for the nuclear fuel specification has a sintering density ranging from about 94.0% to about 96.5% of a theoretical density (T.D), and manufacturing conditions of the oxide fuel pellets having a density within the sintering density range are as follows.

A sintering time is about 2 hours, a compaction pressure is about 370 MPa or more in case of a sintering temperature of about 1,000° C., a compaction pressure is about 220 MPa or more in case of a sintering temperature of about 1,100° C., a compaction pressure is about 220 MPa or more in case of a sintering temperature of about 1,200° C., and a compaction pressure is about 150 MPa or more in case of a sintering temperature of about 1,300° C.

Also, when a sintering time is about 5 hours, a compaction pressure is about 270 MPa or more in case of a sintering temperature of about 1,000° C., a compaction pressure is about 170 MPa or more in case of a sintering temperature of about 1,100° C., a compaction pressure is about 150 MPa or more in case of a sintering temperature of about 1,200° C., a compaction pressure is about 150 MPa or more in case of a sintering temperature of about 1,300° C., and a compaction pressure is about 300 MPa or less in case of a sintering temperature of about 1,400° C.

Further, as illustrated in FIG. 7, it was confirmed that the oxide fuel pellets that are adequate for the nuclear fuel specification has a grain size of about 5 μm or more, and manufacturing conditions of the oxide fuel pellets having a grain size within the above-described grain size range are as follows: a temperature of about 1,200° C. or more and a sintering time of about 2 hours or more. Here, it was confirmed that the compaction pressure has a slight influence on the grain size.

As described above, conditions adequate for manufacturing the oxide nuclear fuel pellets, that are adequate for the nuclear fuel specification, having the conditions in which the theoretical density (T.D) of about 94.0% to about 96.5% and the grain size of about 5 μm or more are as follows.

When a sintering time is about 2 hours, a compaction pressure is about 200 MPa or more in case of a sintering temperature of about 1,200° C., a compaction pressure is about 150 MPa or more in case of a sintering temperature of about 1,300° C., and a compaction pressure is about 150 MPa or more in case of a sintering temperature of about 1,400° C. When a sintering time is about 5 hours, a compaction pressure is about 150 MPa or more in case of a sintering temperature of about 1,200° C., a compaction pressure is about 150 MPa or more in case of a sintering temperature of about 1,300° C., and a compaction pressure is about 300 MPa or less in case of a sintering temperature of about 1,400° C.

(3) Analysis of Sintering Density and Grain Size of Oxide Fuel Pellet Depending on Sintering Under Nitrogen Atmosphere To confirm the sintering density and grain size of the oxide fuel pellets manufactured by the manufacturing method according to the present invention, sintering densities of the oxide fuel pellets manufactured in Embodiments 37 to 54 and Comparative Examples 25 to 36 were measured in an immersion method, grain sizes were measured in the Heyn's lineal intercept (ASTM E112) method, and their results were illustrated in FIGS. 8 to 10.

As illustrated in FIGS. 8 and 9, the oxide fuel pellets that are adequate for the nuclear fuel specification has a sintering density ranging from about 94.0% to about 96.5% of a theoretical density (T.D), and manufacturing conditions of the oxide fuel pellets having a density within the sintering density range are as follows.

A sintering time is about 2 hours, a compaction pressure is about 350 MPa or more in case of a sintering temperature of about 1,000° C., a compaction pressure is about 200 MPa or more in case of a sintering temperature of about 1,100° C., a compaction pressure is about 190 MPa or more in case of a sintering temperature of about 1,200° C., a compaction pressure is about 150 MPa or more in case of a sintering temperature of about 1,300° C., and a compaction pressure is about 150 MPa or more in case of a sintering temperature of about 1,400° C.

Also, when a sintering time is about 5 hours, a compaction pressure is about 270 MPa or more in case of a sintering temperature of about 1,000° C., a compaction pressure is about 190 MPa or more in case of a sintering temperature of about 1,100° C., a compaction pressure is about 150 MPa or more in case of a sintering temperature of about 1,200° C., a compaction pressure is about 190 MPa or more in case of a sintering temperature of about 1,300° C., and a compaction pressure is about 320 MPa or less in case of a sintering temperature of about 1,400° C.

Further, as illustrated in FIG. 10, it was confirmed that the oxide fuel pellets that are adequate for the nuclear fuel specification has a grain size of about 5 μm or more, and manufacturing conditions of the oxide fuel pellets having a grain size within the above-described grain size range are as follows: a temperature of about 1,200° C. or more and a sintering time of about 2 hours or more. Here, it was confirmed that the compaction pressure has a slight influence on the grain size.

As described above, conditions adequate for manufacturing the oxide nuclear fuel pellets, that are adequate for the nuclear fuel specification, having the conditions in which the theoretical density (T.D) of about 94.0% to about 96.5% and the grain size of about 5 μm or more are as follows.

When a sintering time is about 2 hours, a compaction pressure is about 190 MPa or more in case of a sintering temperature of about 1,200° C., a compaction pressure is about 150 MPa or more in case of a sintering temperature of about 1,300° C., and a compaction pressure is about 150 MPa or more in case of a sintering temperature of about 1,400° C. When a sintering time is about 5 hours, a compaction pressure is about 190 MPa or more in case of a sintering temperature of about 1,200° C., a compaction pressure is about 150 MPa or more in case of a sintering temperature of about 1,300° C., and a compaction pressure is about 320 MPa or less in case of a sintering temperature of about 1,400° C.

In the method for manufacturing the oxide fuel pellets according to the present invention, the sintering may be performed at a low temperature of about 1,200° C. to about 1,400° C. to manufacture the economical and safe oxide fuel pellets that are adequate for the nuclear fuel specification.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing oxide fuel pellets, the method comprising:
   (step 1) preparing nuclear fuel powder containing uranium dioxide ($UO_{2+x}$, x=0 to 0.20);
   (step 2) compacting the nuclear fuel powder prepared in step 1 to manufacture green pellets;
   (step 3) sintering the green pellets manufactured in step 2 at a temperature of about 1,200° C. to about 1,400° C. by using an atmosphere gas; and
   (step 4) reducing the green pellets sintered in step 3 at a temperature of about 800° C. to about 1,000° C. by using a reducing atmosphere gas.

2. The method as set forth in claim 1, wherein the nuclear fuel powder in step 1 further contains gadolinia ($Gd_2O_3$) or plutonium oxide ($PuO_2$).

3. The method as set forth in claim 1, wherein the manufacturing of the green pellets in step 2 is performed under a compaction pressure of about 100 MPa to about 500 MPa.

4. The method as set forth in claim 1, wherein the manufacturing of the green pellets in step 2 is performed under a compaction pressure of about 150 MPa to about 450 MPa.

5. The method as set forth in claim 1, wherein the atmosphere gas in step 3 comprises at least one kind of compound selected from the group consisting of carbon dioxide, nitrogen, and argon.

6. The method as set forth in claim 1, wherein the sintering in step 3 is performed for about 2 hours to about 8 hours.

7. The method as set forth in claim 1, wherein the sintering in step 3 is performed for about 2 hours to about 5 hours.

8. The method as set forth in claim 1, wherein the atmosphere gas in step 4 comprises a hydrogen gas.

9. The method as set forth in claim 1, wherein the reducing in step 4 is performed for about 1 hour to about 5 hours.

10. The method as set forth in claim 1, wherein the sintering and reducing in steps 3 and 4 are continuously performed.

* * * * *